July 5, 1955   W. M. ALLEN   2,712,196
FLY LINE TERMINAL ANCHOR
Filed July 15, 1954

INVENTOR
WESLEY M. ALLEN
By *Philip B. Plater*
ATTORNEY

United States Patent Office 2,712,196
Patented July 5, 1955

2,712,196
FLY LINE TERMINAL ANCHOR

Wesley M. Allen, Windsor, Mo.

Application July 15, 1954, Serial No. 443,663

2 Claims. (Cl. 43—43.1)

This invention relates specifically to a device by which a leader may be attached to a braided tubular fly line. This application is a continuation-in-part of my application Serial No. 192,090, filed October 25, 1950, now abandoned.

In both wet and dry fly fishing a braided tubular line is used, generally made of oiled silk or nylon. Such a line is actually made by building up successive layers of wax or plastic on a braided tube of silk or nylon. This produces a waterproof floatable line. As is well known in the art, such a line may be hollow, or may be provided with a core of powdered cork or the like buoyant material. In either event, braided fly lines have a weak central portion. Fly lines are commonly made in sizes A through H, although the A size is seldom used by fly fishermen. The approximate diameters of these lines is given in the following National Association of Angling and Casting Clubs' official standard table of fly line calibrations:

| Letter size: | Nominal diameters in inches |
|---|---|
| H | .025 |
| G | .030 |
| F | .035 |
| E | .040 |
| D | .045 |
| C | .050 |
| B | .055 |

A relative thin leader, usually of gut or nylon, is fastened to the end of the tubular line, and the fly is fastened to the leader. Leaders generally are made in diameters from .0055 inch for a very light leader (5X gauge) to .020 inch for a very heavy leader (⅕ gauge).

Heretofore leaders have been fastened to the ends of fly lines by knotting the leader and fly line together. This method produces a bulky knot which has been tolerated only because it has been considered unavoidable. The greater part of the bulk of the knot is, of course, produced by the relatively thick fly line. A further objection to the method of joining fly line and leader in the manner known heretofore is that the disparity in size between the fly line and leader, and the characteristic "slickness" of the fly line and leader make a secure fastening difficult. Other objections are, that the leader must be tied behind the knot in the fly line so that the free end of the fly line tends to cock, and that the leader tends to cut the fly line.

One object of this invention is to provide a device by which a leader may be securely attached to the end of a braided tubular fly line without a bulky knot.

Another object is to provide such a device which is cheap, easy to manufacture, light in weight, simple to employ and dependable in use.

Other objects will be apparent to those skilled in the art in the light of the following specification and accompanying drawing.

In accordance with this invention, generally stated, a device is provided with an extremely thin shank upon which are minute barbs or prongs. The shank is so thin as to permit its being inserted axially snugly within the core of a braided tubular fly line. When the shank is so inserted, with the barbs flaring outwardly toward the end of the tubular fly line through which the shank extends, the barbs, engaging the inside surface of the braided line, act to anchor the shank against retraction from the line with a holding power all out of proportion to their size. Preferably the barbs do not penetrate the outside surface of the line.

Figure 1:
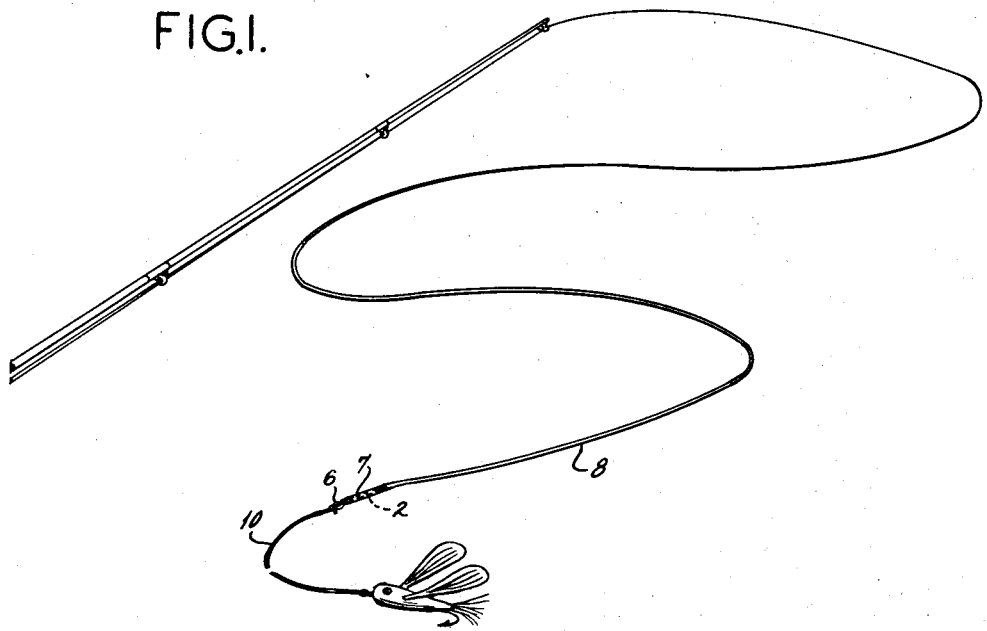
Figure 1 is a view in side elevation of a device of this invention inserted within an end of a braided tubular fly line, and to which a leader is attached.
Figure 2:
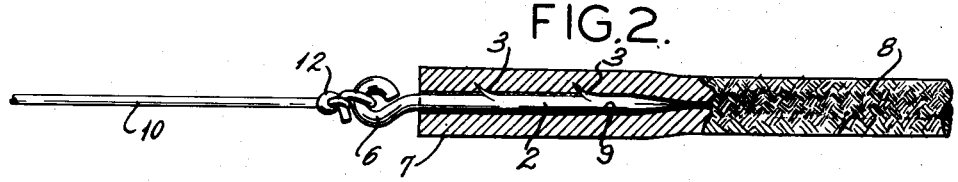
Figure 2 is an enlarged view, partly in section, of the device shown in Figure 1.
Figure 3:
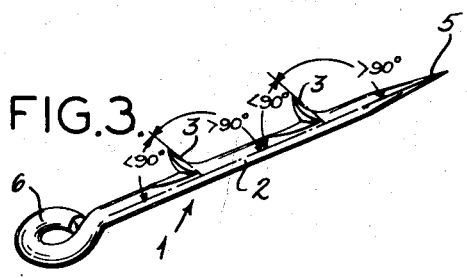
Figure 3 is a view in perspective of the device shown in Figure 1.

Referring now to Figures 1 through 3 of the drawing for an illustrative embodiment of this invention, reference numeral 1 indicates a complete terminal anchor. The terminal anchor 1 has a shank 2 upon one side of which are prongs or barbs 3. At one end, the terminal anchor 1 has a point 5. At its opposite end, the terminal anchor of this embodiment is provided with an eye 6.

The shank 2 extends through an open end 7 into a central core 9 of a braided tubular fly line 8, with the barbs 3 flaring outwardly toward the end 7. A leader 10 is tied to the eye 6 with a small knot 12.

In using the terminal anchor of this invention, the pointed end of the shank is simply inserted in the core 9 at the open end of the braided tubular fly line. It is pushed in manually as far as it will go. It may be found desirable to tap the eye end of the anchor with a light metal object to force the shank in all the way. With the barbs or prongs 3 on only one side of the shank, in contrast with barbs projecting from opposite sides, the shank may easily be inserted within the core, since the effective combined width of the shank and prongs is relatively small, and the smooth side of the shank provides a bearing surface and reduces the tendency for the shank to cock in the core. As can be seen from the drawing, the normal diameter of the bore 9 is less than the diameter of the shank 2, but the combined width of the shank 2 and prongs 3 is less than the diameter of the line 8. The leader may be attached either before or after the shank is inserted.

A terminal anchor constructed in accordance with the embodiment illustrated and described will anchor itself so securely that a force sufficient to break the leader will show no appreciable tendency to pull the shank from the line. As a matter of possible explanation, but not by way of limitation, it is suggested that the braided line itself grips the shank when a retractive force is applied, since the tendency to elongate the line tends also to decrease the diameter of the line, much in the manner of a Chinese finger puzzle. Certainly the projection of the prongs 3 at an angle other than 90° to the shank as indicated particularly in Figure 3, produces a camming action in the line.

The anchor may be made of any suitable wire, such as steel, bronze, aluminum and the like which possess the proper qualities of rigidity and strength. The anchor is so small as compared with the line, that even when the anchor is made of the heavier metals the line floats lightly on the water. On the other hand, when a sinking line is desired, as in some wet fly fishing, the anchor does not prevent the line's sinking.

The eye or ring of the anchor may be made by bending one end of the shank in a loop, as in the illustrative embodiment, or may be provided in any of a number of suitable ways.

It can be seen that a simple, sturdy, cheap device is provided by which a neat, strong connection may quickly and easily be made between a fly line and leader.

Having thus described the invention, what is claimed and desired to be secured by Letters Patent is:

1. A leader and line connection comprising a rigid wire element having a straight shank with an eye at one end thereof, prongs projecting only from one side of the shank and in the same general direction at an angle other than 90° to the shank, said shank having a spear point at one end thereof and said line being braided and having a weak central portion, the normal diameter of the central portion being substantially constant throughout a length thereof substantially equal to the length of the shank, said normal diameter being less than the diameter of the shank, the combined width of the shank and prongs being less than the diameter of the braided line.

2. A leader and line connection comprising a rigid wire element having a straight shank with an eye at one end thereof, said eye having a normal knotted connection with the leader, prongs projecting from said shank and in the same general direction at an angle other than 90° to the shank, said shank having a spear point at one end thereof and said line being braided and having a weak central portion, the normal diameter of the central portion being substantially constant throughout a length thereof substantially equal to the length of the shank, said normal diameter being less than the diameter of the shank, the combined width of the shank and prongs being less than the diameter of the braided line.

References Cited in the file of this patent

UNITED STATES PATENTS

| | | |
|---|---|---|
| 531,140 | Stapp | Dec. 18, 1894 |
| 1,578,189 | Dawson | Mar. 23, 1926 |
| 1,602,312 | Qurin | Oct. 5, 1926 |
| 2,040,992 | Harris | May 19, 1936 |
| 2,085,320 | Kolstrand | June 29, 1937 |
| 2,164,296 | Wilcox | June 27, 1939 |
| 2,322,378 | Merrick | June 22, 1943 |
| 2,533,418 | Benoit | Dec. 12, 1950 |

FOREIGN PATENTS

| | | |
|---|---|---|
| 431,557 | Great Britain | July 10, 1935 |